Nov. 18, 1924.
B. P. KITCHELL
1,516,018
WHEEL FOR MOTOR VEHICLES
Filed Oct. 18, 1919 2 Sheets-Sheet 1
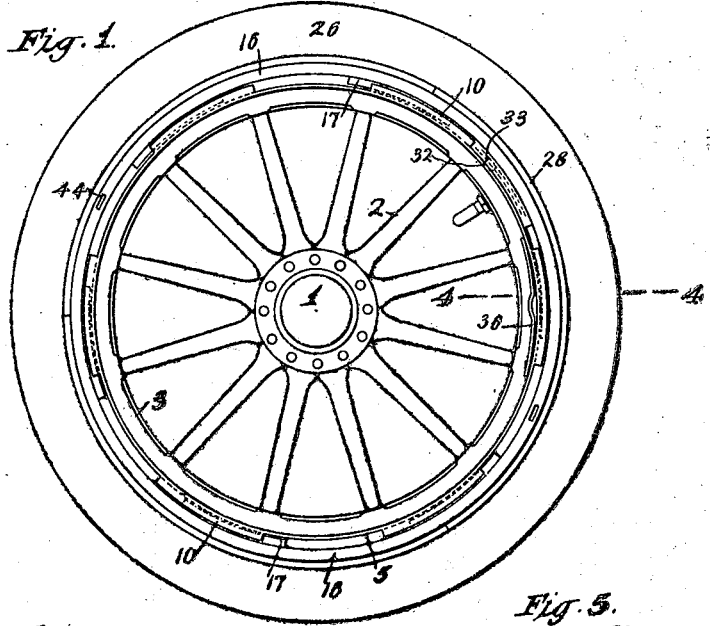
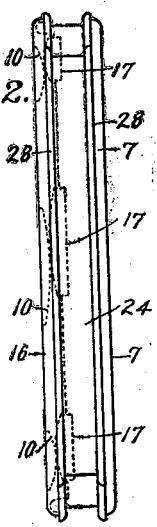
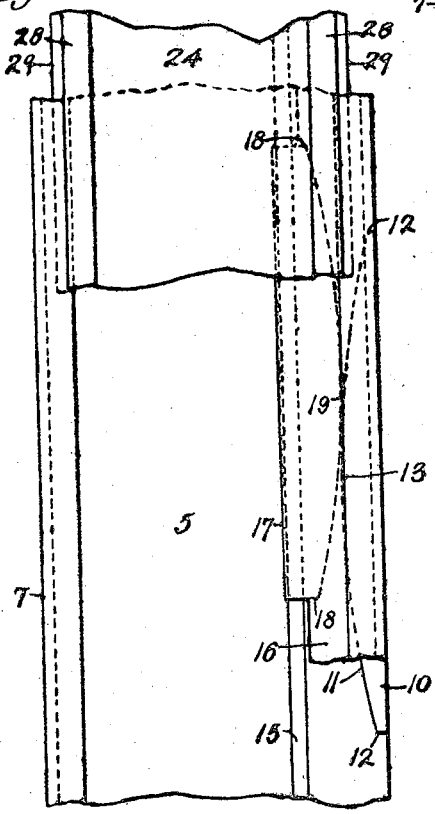
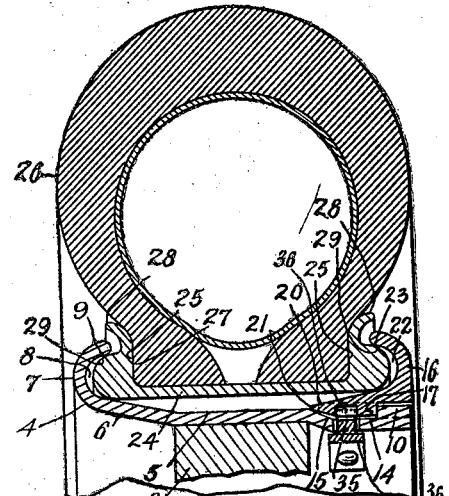

Nov. 18, 1924.
B. P. KITCHELL
WHEEL FOR MOTOR VEHICLES
Filed Oct. 18, 1919
1,516,018
2 Sheets-Sheet 2
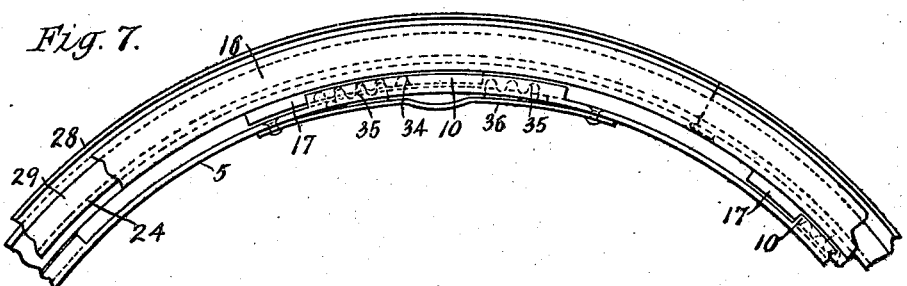
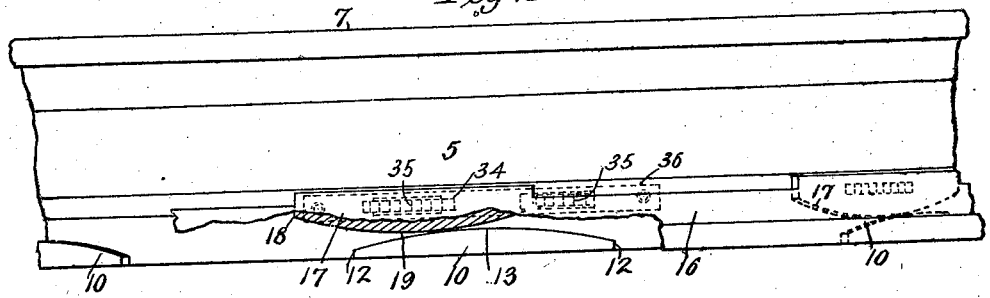
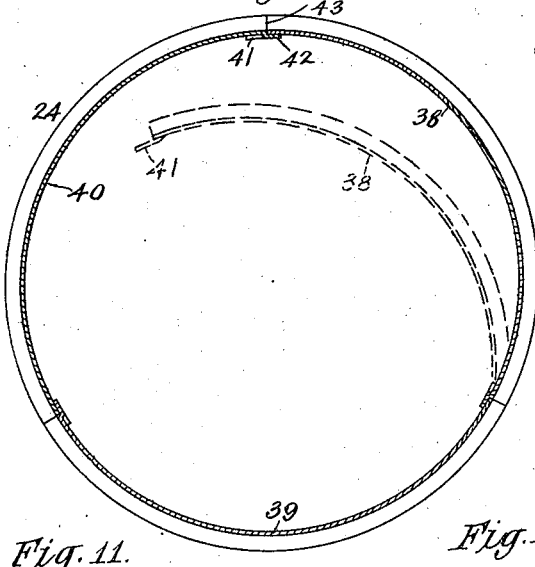
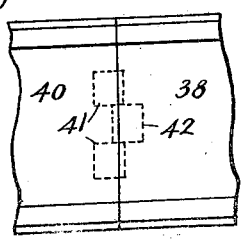
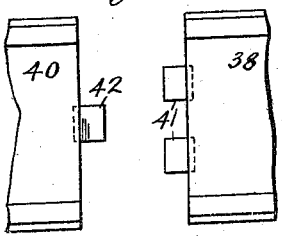
Inventor:
Bruce P. Kitchell
by his Attys:

Patented Nov. 18, 1924.

1,516,018

UNITED STATES PATENT OFFICE.

BRUCE P. KITCHELL, OF RED BANK, NEW JERSEY.

WHEEL FOR MOTOR VEHICLES.

Application filed October 18, 1919. Serial No. 331,596.

*To all whom it may concern:*

Be it known that I, BRUCE P. KITCHELL, a citizen of the United States, residing at Red Bank, county of Monmouth, and State of New Jersey, have invented certain new and useful Improvements in Wheels for Motor Vehicles, fully described and represented in the following specification and the accompanying drawings, forming a part of the same.

This invention relates to certain improvements in vehicle wheels.

It is the especial object of the invention to provide a vehicle wheel for automobile vehicles having a tire carrying rim on which a tire, either pneumatic or solid, is secured, a support for this rim, and a removable locking member for locking the rim to the support, the support and the locking member having co-operating locking devices so formed that when the locking member is moved to and is in locking position an inward and downward thrust is exerted on the tire carrying rim so that the rim is held against any upward or expansive movement and preferably against any rotary movement to prevent creeping on the support, the parts being held absolutely rigidly together so that until the locking member is moved to release the rim the rim cannot be removed from the support accidentally or otherwise.

It is a further object of the invention to provide an improved construction for the tire carrying rim whereby the rim may be collapsed to free a tire therefrom and expanded to hold a tire in position, the rim being formed in two or more parts with means for holding the parts together when in expanded position, these means being of such character as to obviate the use of special lugs, wedges or similar devices which have to be manipulated by a tool into and out of operative position, and add to the expense of making the rim, and are troublesome in assembling the parts.

A further object of the invention is to provide a rim, support, and locking member of such a character that the parts may be of rolled metal, thus providing a simple and cheap construction and one that may be readily manipulated to lock on and remove the tire carrying rim from the rim support.

With these and other objects not specifically referred to in view, the invention consists of certain novel parts and combinations which will be described in connection with the accompanying drawings and pointed out in the claims annexed hereto.

In the drawings:—

Figure 1 is a side view showing the invention as applied to an automobile wheel of the wooden type, as is usual in such wheels with felly band and wooden spokes.

Figure 2 is an edge view of the rim, rim support and the locking member shown in Fig. 1, the tire being removed.

Figure 3 is a plan view illustrating in dotted lines the co-operative locking devices of the rim support and the locking member.

Figure 4 is a vertical cross section on an enlarged scale partly broken away, of the construction shown in Fig. 1, the view being taken on line 4—4 of that figure.

Figures 5 and 6 are detail sectional views showing modifications in the form of the tire carrying rim which may be employed.

Figure 7 is a side view partly broken away on an enlarged scale showing the locking means which may be employed for holding the locking member against rotation.

Figure 8 is a plan view, partly in section and partly broken away to show the construction of the parts shown in Fig. 7.

Figure 9 is a detail sectional view on an enlarged scale of the locking devices for preventing rotary movement of the locking member, shown in Fig. 7.

Figure 10 is a sectional view of a preferred form of tire carrying rim.

Figures 11 and 12 are fragmentary views showing the preferred means employed for holding the sections of the rim together, the parts being shown in closed, and open or collapsed positions, respectively.

Figures 13 and 14 are detail sectional views of the holding devices for holding the parts of the rim in closed position.

Referring now to the drawings, the invention has been illustrated as embodied in an automobile wheel of the ordinary type having a felly and spokes of wood. It will be understood that as to certain of the features of the invention, the invention is intended for use and may be used with other types of wheels, such as for instance, the so-called wire wheels or wheels having wire spokes used to some extent on automobiles.

The wheel shown is the ordinary wooden wheel having a hub 1 and spokes 2, these spokes being as usual, secured to a felly 3. This type of wheel is usually provided with a metal band 4, this band being termed the felly band and in the wheel shown forming the support for the tire carrying rim.

For purposes hereinafter referred to, this felly band or rim support is of novel configuration, and there is provided a removable locking member which co-operates with this felly band to hold the tire rim fast thereto and against any upward movement away from the rim.

In the particular construction illustrated, the felly rim is formed with a central flat portion 5 which is secured to the felly 3 of the wheel. At one side, as is shown, on the inside of the wheel, the felly rim is extended outwardly and slightly upwardly, as indicated at 6, and at its outer edge is formed with holding projections. These holding projections may be of various configurations but in the best constructions and as preferred, these holding projections are in the form of a curved flange 7 extending continuously around the periphery of the felly rim 4 forming a holding groove or recess 8 and a holding edge 9. The other side of the felly band or rim, that is, the outside of the wheel, is extended beyond the felly 3 and is formed at this side with locking devices with which co-operate locking devices on the locking member hereinafter referred to.

While the locking devices may be of various characters, in the preferred construction, these locking members are in the form of cam blocks or wedges 10, these cams being preferably formed at the outside of the rim and having inner curved cam faces 11, these faces extending from the low part 12 at each end to the high part 13 in the middle. These cams or wedges are provided in any desired number around the periphery of the rim 4, six being illustrated in the present instance. The rim is bent or rolled so as to form a recess 14 inside the cams 10 and the opposite or inner side of this recess is inclined, as indicated at 15, for purposes hereinafter referred to.

Co-operating with the locking cams or wedges 10 on the felly rim 4 is a locking member which can be moved to lock the tire rim in position against upward movement and which can be moved away so as to free the tire rim so that it can readily be removed from the wheel, so as to produce an easily demountable rim. While this locking member and the means for moving it may be of various characters, preferably a single member is employed, which is moved into and out of locking relation by a rotary movement relatively to the felly rim or support, this member being provided with locking devices arranged to co-operate with the locking cams before referred to. In the particular construction illustrated, this locking member is in the form of a ring 16 rolled, cut or turned to form locking cams or wedges 17 similar to the wedges 10 on the felly rim. These wedges 17 like the wedges 10 have a curved face extending from the low point 18 to the high point 19. The inside of this ring is also provided with an upper slanting face 20 and a sharp edge 21 so that it can be readily slipped into position. The inner face above the incline 21 is grooved to form a recess 22 and a curved over holding edge 23.

The tire carrying rim may be of various configurations depending on the type of wheel with which it is to be used, and the type of tire which is carried thereby. This tire carrying rim will, however, whatever its construction, be provided with holding projections shaped to seat in the recesses 8 and 22 of the support and the locking member, before described, and these projections will have shoulders or abutments on which the holding surfaces 9 and 23 may take to exert a downward thrust on the tire rim and hold the rim against upward movement or movement away from the felly rim, so that the rim will be positively and irremovably locked in position on the support while the locking member or ring is in locked position.

While this may be effected in various ways, in the particular construction illustrated, referring to Fig. 4, a rim 24 is shown as provided with an internal channel formed with vertical sides 25. This form of rim is suitable for holding a straight side casing or shoe indicated at 26, that is, a casing having its holding edges as 27 straight. This rim will be provided with exterior holding projections on each side, which may be in the form of rounds 28 extending around the periphery of the rim and grooved to form shoulders 29, the edges 9 and 23 of the rim and the locking member entering these grooves and exerting a downward thrust on the shoulders. In Fig. 5 the shoulders are shown as formed with squared edges 30 which may be used if desired, and in Fig. 6 a rim suitable for use with a clincher or beaded tire, indicated at 31, is illustrated.

Means are preferably provided for preventing any rotary or creeping movement of the tire rim relatively to the support, though with the locking member formed as described, such movement is not apt to take place. While this may be effected in various ways, in the particular construction illustrated, the tire rim may be provided with a lug projection 32 taking into a suitable slot or opening 33 in the felly rim or other support, before referred to.

With the construction so far described, owing to the form of the locking devices a rotary movement of the wheel in the same direction, as for instance, forward, would only serve to lock the parts more tightly together, and the locking ring could not come off, and the parts would probably maintain such locked relation if the wheel were turned in the reverse direction for short stretches. To avoid, however, any possibility of the parts becoming loosened and the ring coming off due to a reverse rotation of the wheel, as for instance, backing a car, means are preferably provided by the present invention for positively locking the locking member against a rotary movement. While this may be effected in various ways, in the particular construction illustrated two of the adjoining cams or wedges 17 of the locking ring are provided with recesses 34 which are arranged to take locking teeth 35 carried on a spring 36 secured in any suitable manner as by studs 37 to the under surface of the felly rim 4, or other support which may be used. These teeth are shown in two sets arranged at each end of the spring. This construction is adapted so that the wheel may be locked by rotating it in either direction. The cams or wedges 10 and 17, before referred to, are formed as shown, so that this locking rim may be put on and the parts locked together by rotating the ring in either direction, this being advantageous for some purposes.

The invention as so far described, may be and is intended to be used with a continuous tire supporting rim and such a rim can be held rigidly locked in position on a support as described. In the best constructions, however, for ease in removing a shoe or casing from the tire rim, this tire rim will be split or will be made collapsible so that it can be withdrawn away from the shoe and by my invention I have provided a collapsible rim of simple form and improved and economical construction. While this rim as to some details, may be varied, it will be as shown a multipart rim and in the specific instance shown is a three-part rim having the parts 38, 39, and 40. These parts are secured together so that they may be readily separated to collapse the rim, but also so that they will be held rigidly together when in expanded position with the tire thereon, and these means preferably will be such that no manipulation of them per se to unlock or lock them is necessary. As illustrated one end of each rim section, as one end of the rim section 38, is provided with a pair of flat spaced lugs 41, and the adjacent end of rim section 40, for instance, is provided with lug 42 arranged to extend into the space between the lugs 41, and when the parts are in closed position these lugs overlap on the ends adjacent them as shown in Fig. 11. To separate these it is only necessary to insert a screw driver or other tool in the crack 43 between the sections and pry the section apart sufficiently for the lugs to clear whereupon the sections will collapse of their own weight or may be readily collapsed, the spring of the metal permitting the slight separation necessary.

With this construction a very simple collapsible rim is provided and one in which it is unnecessary to manipulate the locking lugs to lock or unlock the parts, and wedges and screw bolts and other cumbersome expensive devices are eliminated. The locking ring 16, before referred to, is provided with a recess or slot 44 in which a tool may be inserted for rotating the ring to lock or unlock it from the supporting felly rim 4, before referred to.

The operation of my improved wheel is believed to be clear from the foregoing, but may be briefly described as follows:—

In putting a tire in place the tire rim is collapsed and the tire put in place, the sections being expanded and locked in position by bringing the locks into engagement with each other and with the rim sections.

The rim is then slipped upon the felly rim or other support so that the round 28 enters the recess 8 in the inside edge of the felly rim and the holding edge 9 bears on the shoulder 29. The locking ring 16 is then slipped in place and through a tool or in any other suitable manner, turned so as to cause the cam surfaces of the wedges 10, 14 to ride up on each other. This causes a downward thrust of the locking edges 9, 23 on the shoulders 29, the bottom edges of the tire rim taking against the inclines 6 and 21. The rim thus takes bearing at what may be said to be four points, and when the locking ring is moved into locking position the tire rim is rigidly held against any upward movement and cannot be freed from the support in any way except by rotating the ring in the opposite direction to release the cam surfaces from each other. The rim cannot, therefore, come off of the support accidentally.

While the invention has been shown and described in its preferred form, it will be understood that it is capable of use with various types of wheels, and that as to certain features with various types of tire rims, and the invention is, therefore, not to be restricted to the kind of wheel shown, and certain changes and variations in the specific construction of the parts may be made without departing from the invention.

What I claim is:

1. A wheel provided with a felly band, a flange at one side edge of said band adapted to engage a demountable tire rim, and spaced lugs provided at the other side edge portion of said band and having inner surfaces convexly curved from end to end and adapted to engage surfaces of a locking ring.

2. A locking ring adapted to secure a demountable rim to a wheel, provided with an outwardly extending flange and with inwardly extending spaced lugs, each of said lugs having its outer surface convexly curved from end to end and these curved surfaces being adapted to engage abutment surfaces of a felly band.

In testimony whereof, I have hereunto set my hand.

BRUCE P. KITCHELL.